US010395274B2

United States Patent
Goyal et al.

(10) Patent No.: US 10,395,274 B2
(45) Date of Patent: Aug. 27, 2019

(54) ADVERTISEMENT PLACEMENT PRIORITIZATION

(71) Applicant: Adobe Inc., San Jose, CA (US)

(72) Inventors: Vishu Goyal, Rohini (IN); Vikram Sethi, Noida (IN); Sparsh Kumar Sinha, New Delhi (IN); Sameer Bhatt, Noida (IN); Rishub Garg, Noida (IN)

(73) Assignee: Adobe Inc., San Jose, CA (US)

( * ) Notice: Subject to any disclaimer, the term of this patent is extended or adjusted under 35 U.S.C. 154(b) by 911 days.

(21) Appl. No.: 14/566,366

(22) Filed: Dec. 10, 2014

(65) Prior Publication Data

US 2016/0171532 A1    Jun. 16, 2016

(51) Int. Cl.
    *G06Q 30/02*    (2012.01)
(52) U.S. Cl.
    CPC ................ *G06Q 30/0252* (2013.01)
(58) Field of Classification Search
    CPC ..... G06Q 30/0251; G06Q 30/00; G06F 15/16
    USPC ...................................... 705/14.49
    See application file for complete search history.

(56) References Cited

U.S. PATENT DOCUMENTS

| 7,558,823 B2 * | 7/2009 | Beers | H04L 12/1818 |
|---|---|---|---|
| | | | 348/14.08 |
| 2012/0158502 A1 * | 6/2012 | Chung | G06Q 30/0255 |
| | | | 705/14.53 |
| 2014/0372211 A1 * | 12/2014 | Kritt | G06Q 30/0251 |
| | | | 705/14.49 |

* cited by examiner

*Primary Examiner* — John Van Bramer
*Assistant Examiner* — Darnell A Pouncil
(74) *Attorney, Agent, or Firm* — SBMC

(57) ABSTRACT

Techniques for advertisement placement prioritization are described. In one or more implementations, a likely line of sight of a viewer of an event to a focus point of the event is determined. Then, a relative location of one or more display devices is identified in relation to the likely line of sight of the viewer. In addition, a priority level is assigned to respective display devices based on corresponding relative locations in relation to the likely line of sight. Further, various demographics and characteristics of audience members can be obtained to determine context-sensitive media content associated with the audience members to present via relatively higher priority display devices. Also, performances of event participants can be determined based on commentary analysis and used to determine context-sensitive media content associated with the event participants to present via the higher priority ad boards.

20 Claims, 10 Drawing Sheets

ADVERTISEMENT PLACEMENT PRIORITIZATION

BACKGROUND

Many venues include perimeter boards or other display devices along a perimeter of a centralized area that are used to display media content such as advertisements ("ads") to people attending an event hosted at the venue. For example, a soccer stadium can have multiple display devices (e.g., ad boards) located along the perimeter of the field.

Conventionally, these ad boards may be given either no priority or substantially equal priority for showing various ads to audience members. However, during an event such as a soccer game, audience members may focus their attention on the ball as the ball moves around the field during gameplay, which can result in less effective advertisements being presented on the ad boards. Further, these conventional techniques lack approaches for presenting context-sensitive ads to the audience members. Accordingly, less effective ads placed in costly ad space can result in lost revenue for advertisers.

SUMMARY

Techniques for advertisement placement prioritization are described. The techniques described herein utilize various heuristics to prioritize display devices used at a live event for displaying media content to viewers. For example, a location of a focus point (e.g., ball at a soccer game) relative to various ad boards and audience members is considered in determining a priority for each ad board in relation to presenting ads to the audience members. Specifically, the techniques described herein place higher priority on ad boards that a viewer can see while focusing on the ball. In implementations, the priority of an ad board can be increased based on a proximity of the ball to the ad board, a distance from the ad board to viewers, a number of viewers viewing the ad board, viewing angles of the viewers, and/or fields of view of the viewers. In addition, various demographics of the audience members, as well as commentary analysis of the action on the field, can be obtained to determine which ads to present on the higher priority ad boards.

Accordingly, context-sensitive ads can be scheduled to be presented on particular ad boards throughout the stadium based on the focus point of the game. Additionally, audience demographics as well as commentary analysis regarding the athletes can be included in determining which context-sensitive ads to present to various audience members via the higher priority ad boards.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
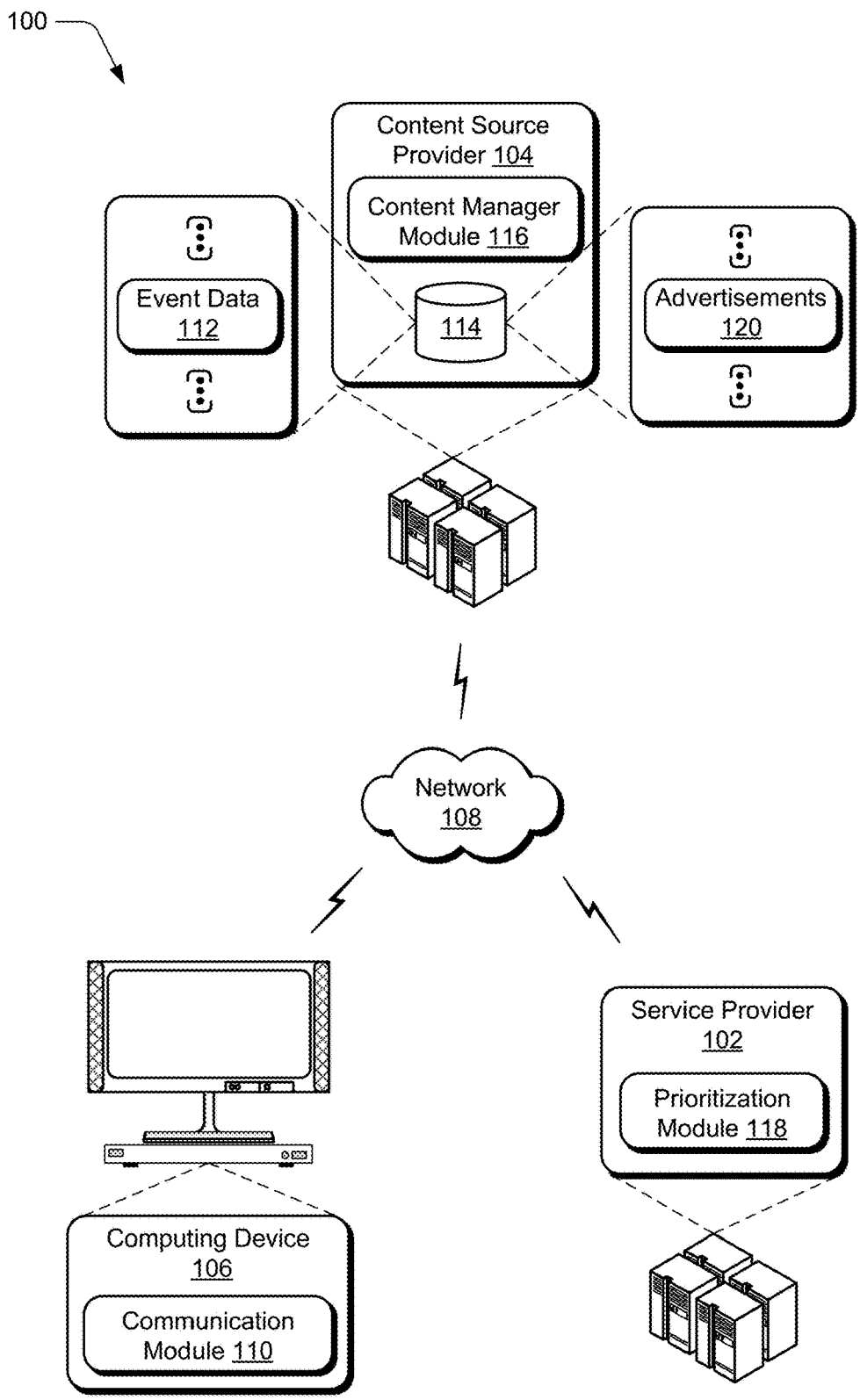
FIG. 1 is an illustration of an environment in an example implementation that is operable to employ techniques for advertisement placement prioritization.

Conventional techniques used for ad boards in large venues generally use either no prioritization or substantially equal prioritization of the ad boards. Further, the ads shown on conventional ad boards generally lack context-sensitivity associated with different audience members. Accordingly, techniques involving advertisement placement prioritization are described. In one or more implementations, a viewer's likely line of sight to a focus point of an event is determined. In addition, a relative location of one or more display devices is identified in relation to the viewer's likely line of sight. Then, a priority level is assigned to respective display devices based on corresponding relative locations in relation to the likely line of sight.

In an example, a soccer stadium may have various ad boards located along the perimeter of the field. During gameplay, the audience may be focused on the ball while the ball moves around the field. Using the ball's location relative to the various ad boards and relative to various audience members, specific ad boards can be given relatively higher priority than other ad boards for displaying advertisements or other content to the audience members. For example, if the ball is kicked near a particular corner of the field, then the audience will likely be looking in the direction of that particular corner. Consequently, the audience members are likely to view an advertisement displayed on ad boards in that particular corner. Indeed, the audience members are more likely to see an advertisement displayed in that particular corner than an advertisement displayed in a different corner of the field. Therefore, the ad boards in that particular corner may be given a relatively higher priority for advertisement placement. Advertisements displayed via these high priority ad boards have a relatively high likelihood of being seen by audience members, thereby increasing a potential effectiveness of those advertisements and creating "prime locations" that are highly valued by advertisers.

Because the ball moves around the field during gameplay, the priority level assigned to respective ad boards are dynamically and automatically adjusted in real time. These adjustments can be based on a variety of different location-based heuristics, such as how close the ball is to a set of ad boards, how far away the ad boards are from the viewer, how many viewers can see the set of ad boards, a viewing angle at which the viewer can see the ad board (e.g., how well the viewer can see the ad board based on how much the ad board is facing the viewer), a field of view of the viewer, and so on. Accordingly, a variety of heuristics are used to prioritize the various ad boards for advertisement placement.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

As employed herein, the term "focus point" is representative of an object or person that is the center of interest of an event. For example, the focus point may be a soccer ball during gameplay of a soccer game, a referee when a penalty is given, a particular actor during a theatrical presentation, an announcer during a pause in the event, an object during an exposition, and so on. Thus, the focus point can be any of a variety of objects or people that are intended to be the center of interest of the event.

As employed herein, the term "ad board" is representative of a display device that is configured to present media content, such as advertisements or other visual content. In at least one example, an ad board can be positioned to be viewable by a plurality of people. For instance, one or more ad boards can be located along a perimeter of a centralized area such as a field or a court. In implementations, the ad board may be configured to present video content, static images, or a combination thereof.

Example Environment

FIG. 1 is an illustration of an environment 100 in an example implementation that is operable to employ techniques described herein. The illustrated environment 100 includes a service provider 102, a content source provider 104, and a computing device 106 that are communicatively coupled via a network 108. Although illustrated separately, functionality represented by the service provider 102, the content source provider 104, and/or the computing device 106 may also be combined into a single entity, may be further divided across other entities that are communicatively coupled via the network 108, and so on.

Computing devices that are used to implement the service provider 102, the content source provider 104, and the computing device 106 may be configured in a variety of ways. Computing devices, for example, may be configured as a desktop computer, a laptop computer, a mobile device (e.g., assuming a handheld configuration such as a tablet or mobile phone), and so forth. Additionally, a computing device may be representative of a plurality of different devices, such as multiple servers utilized by a business to perform operations "over the cloud" as further described in relation to FIG. 11.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be representative of multiple networks.

In implementations, a user may interact with a computing device 106 having a communication module 110 that is configured to support communication via the network 108, such as with one or more services of the service provider 102. As such, the communication module 110 may be configured in a variety of ways. For example, the communication module 110 may be configured as a browser that is configured to "surf the web." The communication module 110 may also be representative of network access functionality that may be incorporated as part of an application, e.g., to provide network-based functionality as part of the application, an operating system, and so on. Thus, functionality represented by the communication module 110 may be incorporated by the computing device 106 in a variety of different ways.

During an event, event data 112 may be generated, or otherwise obtained, that describes various aspects of the event, which is illustrated as stored in storage 114. Because the aspects of the event may include a variety of different forms, event data 112 can likewise include a variety of forms to describe these aspects. The event data 112, for instance, may include any of a variety of different audio and/or visual aspects of the event and/or the viewers of the event. Some examples of the event data 112 include locations of the focus point of the event, locations of respective ad boards used at the event, and locations of respective audience members. Additional examples of the event data 112 include demographic information associated with various audience members and/or information associated with a level of performance of event participants. In implementations, a content manager module 116 may be configured to obtain and monitor the various aspects of the event, and generate the event data 112 that describes the monitored aspects of the event.

The event data 112 may then be exposed by the content source provider 104 for access by a prioritization module 118 of the service provider 102 via the network 108, e.g., via one or more application programming interfaces. The prioritization module 118 may then employ this event data 112 to generate a priority score for respective ad boards located throughout the area that is hosting the event. In addition, the prioritization module 118 may employ the event data 112 to determine context-sensitive advertisements, such as advertisements 120, to present to viewers of the event via the prioritized ad boards. The advertisements 120 may be stored in the storage 114 at the content source provider 104, in storage at a third party entity, further distributed across other entities that are communicatively coupled via the network 108, and so on. In implementations, the advertisements 120 may be stored in storage at the service provider 102. Further discussion of these and other examples may be found in the following section and is shown in corresponding figures.

Example Implementation

The following discussion describes example implementations of advertisement placement prioritization that can be employed to perform various aspects of techniques discussed herein. The example implementations may be employed in the environment 100 of FIG. 1, the system 1100 of FIG. 11, and/or any other suitable environment.

Figure 2:
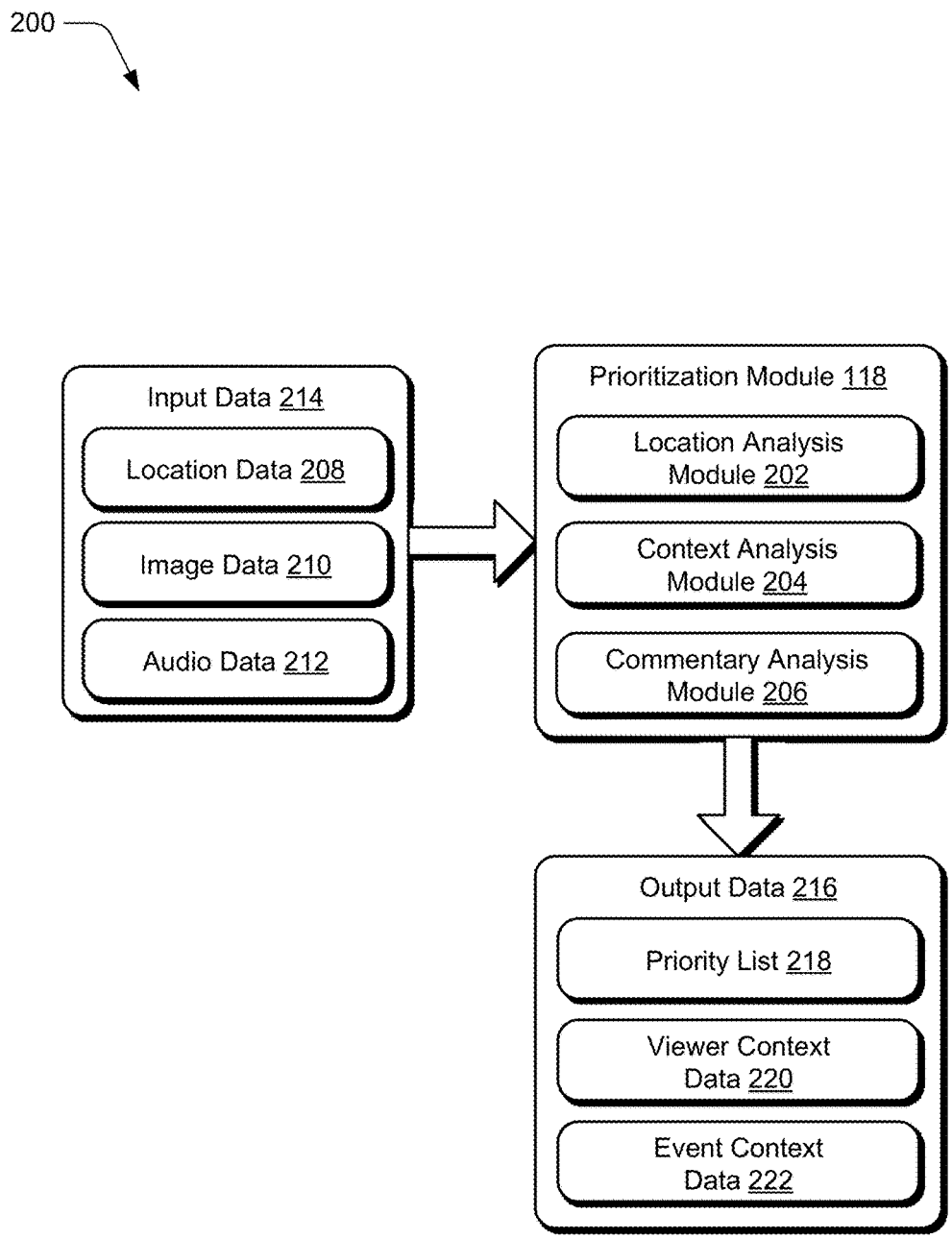
FIG. 2 is an illustration of an example implementation that is operable to employ techniques for advertisement placement prioritization.

FIG. 2 is an illustration of an example implementation 200 that is operable to employ techniques for advertisement placement prioritization. The illustrated implementation 200 includes a prioritization module 118 that includes a location analysis module 202, a context analysis module 204, and a commentary analysis module 206. During an event, image data 208, audio data 210, and/or location data 212 can be captured in any of a variety of ways. For example, image data 208 can be captured by one or more cameras during the event, such as images and/or video of various audience members or sections of audience members, participants of the event, and/or the focus point of the event. Additionally, audio data 210 can be captured or otherwise recorded from commentary associated with the event, such as by announcers, commentators, referees, and so on.

Also, location data 212 can be obtained that is associated with respective locations of audience members, sections of audience members, a focus point of the event, and/or ad boards located throughout the area hosting the event. In at least some implementations, the location data 212 can be obtained from the image data 208. For instance, the focus point can be tracked visually via one or more cameras during the event. Additionally, relative locations of the audience members and/or the ad boards can be determined from the images captured during the event. While the focus point of the event may move throughout the duration of the event, the location of the audience members and ad boards may remain substantially constant.

The image data 208, the audio data 210, and the location data 212 can be employed as input data 214 for the prioritization module 118 to process into output data 216. For example, the content source provider can expose the input data 214 for access by the prioritization module 118 at the service provider 102. In implementations, the location analysis module 202 can utilize the location data 212 to determine a distance between the focus point and an ad board that is located along an axis formed between the focus point and a viewer or a section of viewers. The ad board that is located along, or otherwise intersected by, the axis can be assigned a score associated with a priority for the ad board, based on the calculated distances. In addition, scores can be assigned to additional ad boards that are proximate to the ad board intersected by the axis, based on a viewing angle of the viewer. The score assigned to the ad board can be further modified based on a field of view of the viewer and/or based on a number of people that are able to view the ad board. The scores can be utilized to develop a priority list 218 associated with the ad boards, which can be used to determine which ad boards to use to present advertisements to the viewer or viewers. Further discussion of these and other aspects is provided below.

In one or more approaches, the image data 208 can be utilized by the context analysis module 204 to identify a viewer context. For example, the context analysis module 204 can utilize one or more image recognition techniques to identify various characteristics of the viewers. These characteristics can include one or more demographics such as gender, age, and so on. In some implementations, the context analysis module 204 can identify which event participant(s) the viewer is supporting, such as which team the viewer is cheering for during the event, based on symbols, text, and/or colors identified on the viewer's clothing, body, and/or handheld object. For example, the viewer may be wearing a jacket with their team logo, wearing face-paint with their team colors, holding a flag with their team name, and so on. Thus, a variety of different characteristics can be identified from the image data 208 associated with the viewer.

Using these characteristics, the context analysis module 204 may determine context-sensitive advertisements that can be presented to the viewer. In one example, a soccer game may have a first section of fans with a majority of those fans supporting Team-1 based on visual indicators such as clothing, and a second section having a majority of fans supporting Team-2. Accordingly, advertisements associated with Team-1 can be presented via ad boards that are within a field of view of the first section of fans that substantially support Team-1, while advertisements associated with Team-2 can be presented via ad boards that are within a field of view of the second section of fans that substantially support Team-2. Thus, a variety of different information can be obtained via the image data 208 to develop viewer context data 220 that is usable to determine viewer-context-sensitive advertisements to present to various viewers at the event.

Audio data 212 can be utilized by the commentary analysis module 206 to identify context-sensitive advertisements associated with event participants. For example, if a particular soccer athlete is performing well during the soccer game, a commentator for the soccer game may comment on that athlete's performance. In implementations, action terms can be associated with the athlete based on statements made by the commentator, such as linking a save to a keeper, a header to a striker, a pass to a midfielder, and so on. Additionally, a group of words used by the commentator can be used to determine a sentiment associated with the athlete that indicates a level of associated performance. For example, positive descriptors used by the commentator can indicate that a particular player or team is performing relatively well. This information can then be used to determine advertisements associated with the well-performing athlete or team. In contrast, if an athlete is performing poorly and the commentator comments on the relatively poor performance, then the comments can be used to avoid presentation of advertisements associated with that poorly-performing athlete. Thus, a variety of different information can be obtained via the audio data 212 to develop event context data 222 that is usable to determine which advertisements associated with event participants to present to viewers.

Figure 3:
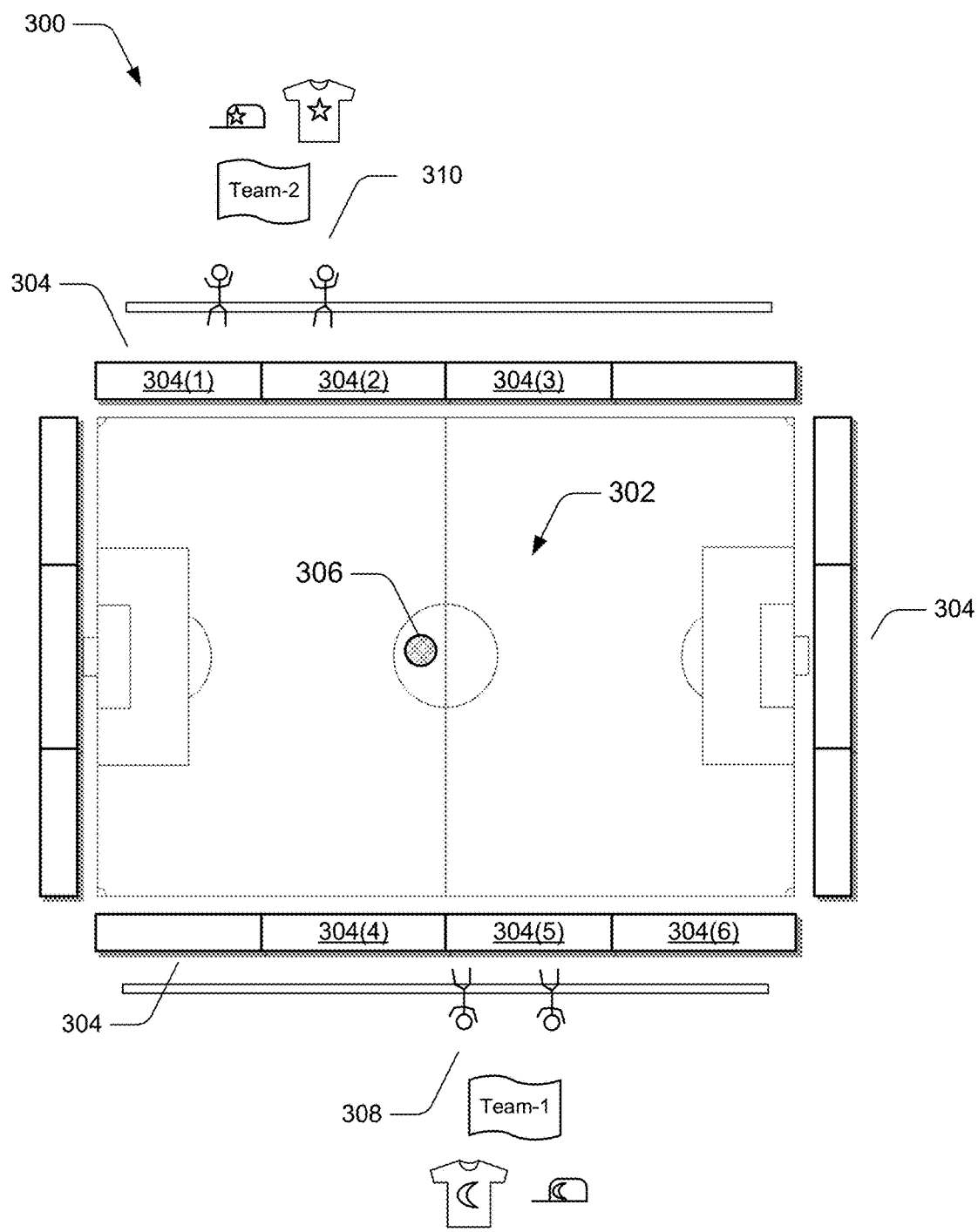
FIG. 3 is an illustration of an example implementation in which techniques for advertisement placement prioritization can be employed in accordance with one or more embodiments.

FIG. 3 illustrates an example implementation 300 in which techniques for advertisement placement prioritization can be employed. The example implementation 300 illustrates an event (e.g., soccer game) that includes a plurality of ad boards 304 located around the perimeter of a central area, such as a field 302. During the event, a focus point 306 (e.g., soccer ball) can move around the field 302. As viewers watch the ball, ad boards 304 that are located in the viewers' field of view on the opposite side of the ball from the viewers can be prioritized to display context-sensitive advertisements for those viewers.

For example, as illustrated in the example implementation 300, ad boards 304(1)-(3) can be prioritized to present advertisements associated with Team-1 based on: the position of the ball relative to viewers 308; viewer context data 220 associated with the viewers 308 based on viewer image data (e.g., team symbols, team colors, or team name, on clothing, bodies, or handheld objects); and/or event context data 222 such as audio commentary associated with players on the field. In contrast, ad boards 304(4)-(6) can be prioritized to present advertisements associated with Team-2 based on the position of the ball, viewer context data 220 associated with viewers 310, and/or audio commentary associated with players on the field. As the ball moves to different locations on the field 302, the priority of respective ad boards 304 can also change.

Figure 4:
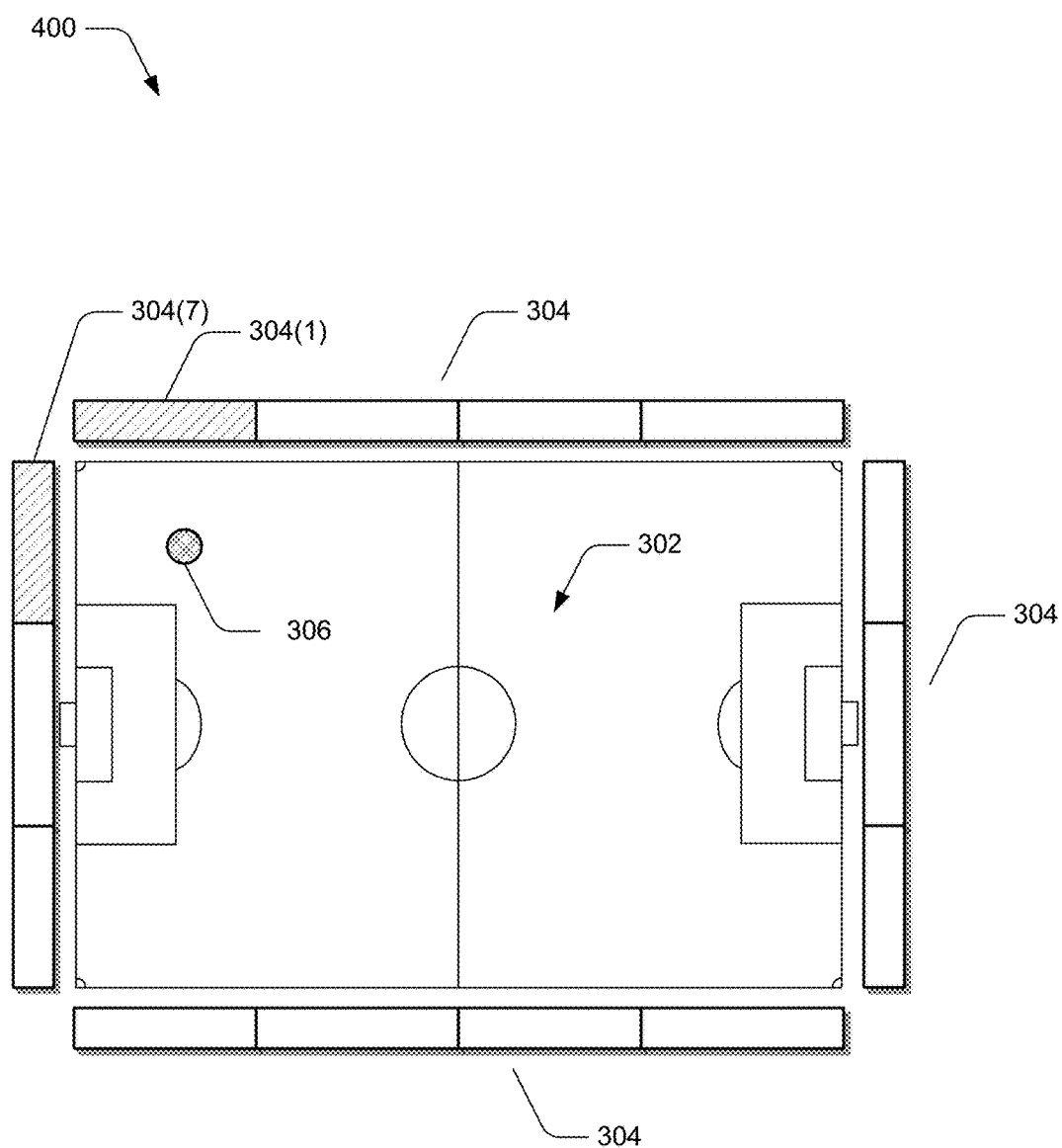
FIG. 4 is an illustration of an example implementation in which techniques for advertisement placement prioritization can be employed based on a proximity of a focus point of an event to one or more ad boards.

FIG. 4 illustrates an example implementation 400 in which techniques for advertisement placement prioritization can be employed based on a proximity of a focus point of an event to one or more ad boards. In the illustrated example, the focus point 306 (e.g., ball) of the soccer game has moved to a corner of the field 302. Based on the distance between the focus point 306 and respective ad boards 304, the ad boards 304(1) and 304(7) can be given higher priority in comparison to the other ad boards 304 around the perimeter of the field 302. The smaller this distance, the higher the likelihood that viewers will notice or see those particular ad boards, thereby increasing an effectiveness of advertisements presented via those particular ad boards. Further discussion of these and other features are described in relation to FIGS. 5-7.

Figure 5:
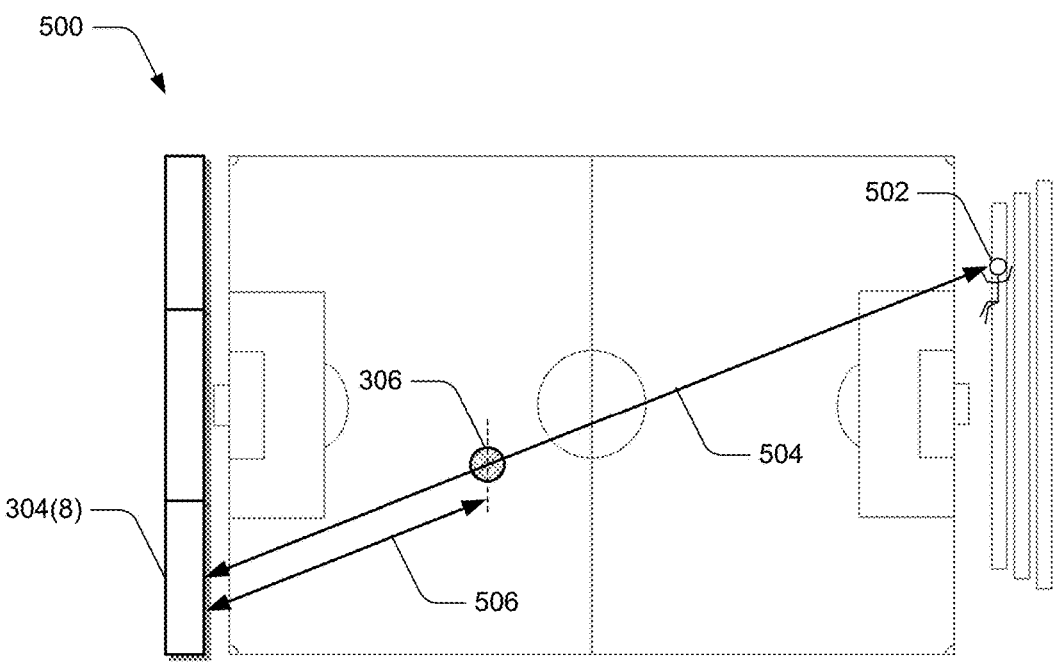
FIG. 5 is an illustration of an example implementation in which techniques described herein can be employed based on distances between a viewer, an ad board, and a focus point.

FIG. 5 is an illustration of an example implementation 500 in which techniques described herein can be employed based on distances between a viewer, an ad board, and a focus point. In implementations, a priority score can be assigned to various ad boards 304 to represent a level of priority of the ad boards 304 in relation to one another. The priority score can be adjusted based on a variety of different heuristics to increase the priority of a particular ad board in relation to one or more other ad boards used at the event. In at least one implementation, the priority of an ad board 304 being viewed is inversely proportional to a distance between the ad board 304 and a viewer 502 along the line of sight of the viewer 502. For example, the line of sight of the viewer 502 can be assumed to form an axis between the viewer 502 and the focus point 306 of the event (e.g., assume the viewer is viewing the ball during the game). Locations associated with the viewer 502, the focus point 306, and a particular ad board 304(8) along the line of sight of the viewer, can be used to measure or otherwise determine a distance 504 between the viewer 502 and the particular ad board 304(8).

In at least one implementation, one or more priority points can be added to the priority score of the particular ad board 304 based on the distance 504, using the following equation:

$$P(i) \propto \frac{1}{D_1} \qquad \text{equation 1}$$

where the term P(i) represents points added to the priority score associated with the ad board being viewed, the term $D_1$ represents a distance from the ad board being viewed to the viewer along the line of sight of the viewer.

In addition or in the alternative, the priority of the ad board being viewed is inversely proportional to a square root of a distance 506 from the ad board 304 being viewed to the focus point 306 along the line of sight of the viewer 502. In implementations, priority points can be added to the priority score associated with the ad board 304 being viewed based on this distance 506, using the following equation:

$$P(i) \propto \frac{1}{(D_2)^{1/2}} \qquad \text{equation 2}$$

where the term $D_2$ represents the distance between the ad board being viewed to the focus point. The viewer's ability to see the advertisement while focusing on the focus point may be increased when the focus point is closer in proximity to the ad board on which the advertisement is being presented. In an example, if the ball is located along a sideline during gameplay, then an advertisement presented on the ad board located just behind that sideline may have a large impact on viewers located on an opposing sideline that can view the ball and the ad board substantially simultaneously. Moreover, for viewers viewing the event via a television device or other computing device, ad boards may only be visible when the ball is near that ad board. Thus, that ad board may be given additional priority points, such that the ad board may become a prime location for advertising.

Figure 6:
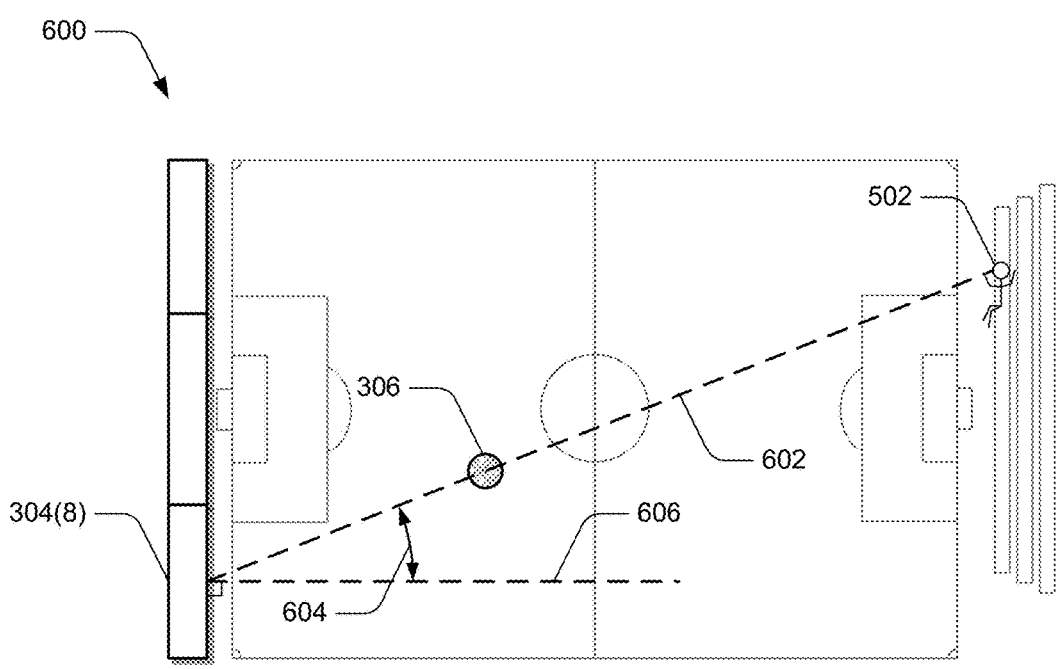
FIG. 6 is an illustration of an example implementation in which a viewing angle of a viewer to an ad aboard is employed in accordance with one or more implementations of advertisement placement prioritization.

FIG. 6 is an illustration of an example implementation 600 in which a viewing angle of a viewer to an ad aboard is employed in accordance with one or more implementations of advertisement placement prioritization. In implementations, the line of sight of the viewer to the focus point can form an axis 602 that intersects a particular ad board 304(8). An angle 604 may be formed between the axis 602 along the line of sight of the viewer 502 and an additional axis 606 that is normal to the ad board 304(8) being viewed. In at least one approach, the priority of the ad board 304(8) being viewed is inversely proportional to the angle 604. Different types of display devices include different maximum viewing angles. A maximum horizontal and/or vertical viewing angle of a light emitting diode (LED) display device may be, for example, 120 degrees. Thus, if the angle formed by the line of sight with the normal to the example LED display device is greater than 60 degrees, then content displayed via the example LED display device can be considered to be invisible to the viewer.

Accordingly, priority points may be added to the score associated with the ad board 304 being viewed based on the angle 604, by at least using the following equations 3-5. For a viewing angle θ between 10 degrees and 60 degrees (e.g., π/18≤θ≤π/3), the following equation can be used:

$$P(i) \propto \frac{1}{\theta} \qquad \text{equation 3}$$

where the term θ represents the viewing angle 604 between the line of sight of the viewer and the normal to the ad board 304(8) being viewed. For a viewing angle less than 10 degrees (e.g., 0≤θ<π/18), the following equation can be employed:

$$P(i) = C * \left(\frac{18}{\pi}\right) \qquad \text{equation 4}$$

where the term C represents a constant. For viewing angles greater than 60 degrees (e.g., θ>π/3), the following equation can be used:

$$P(i) = 0 \qquad \text{equation 5}$$

Although equations 3-5 are designed for a maximum viewing angle of 120 degrees, these equations can be readily tailored to various other maximum viewing angles based on a type of display device used for the ad board 304. In any case, a relatively small viewing angle may receive relatively more priority points compared to a relatively large viewing angle.

Figure 7:
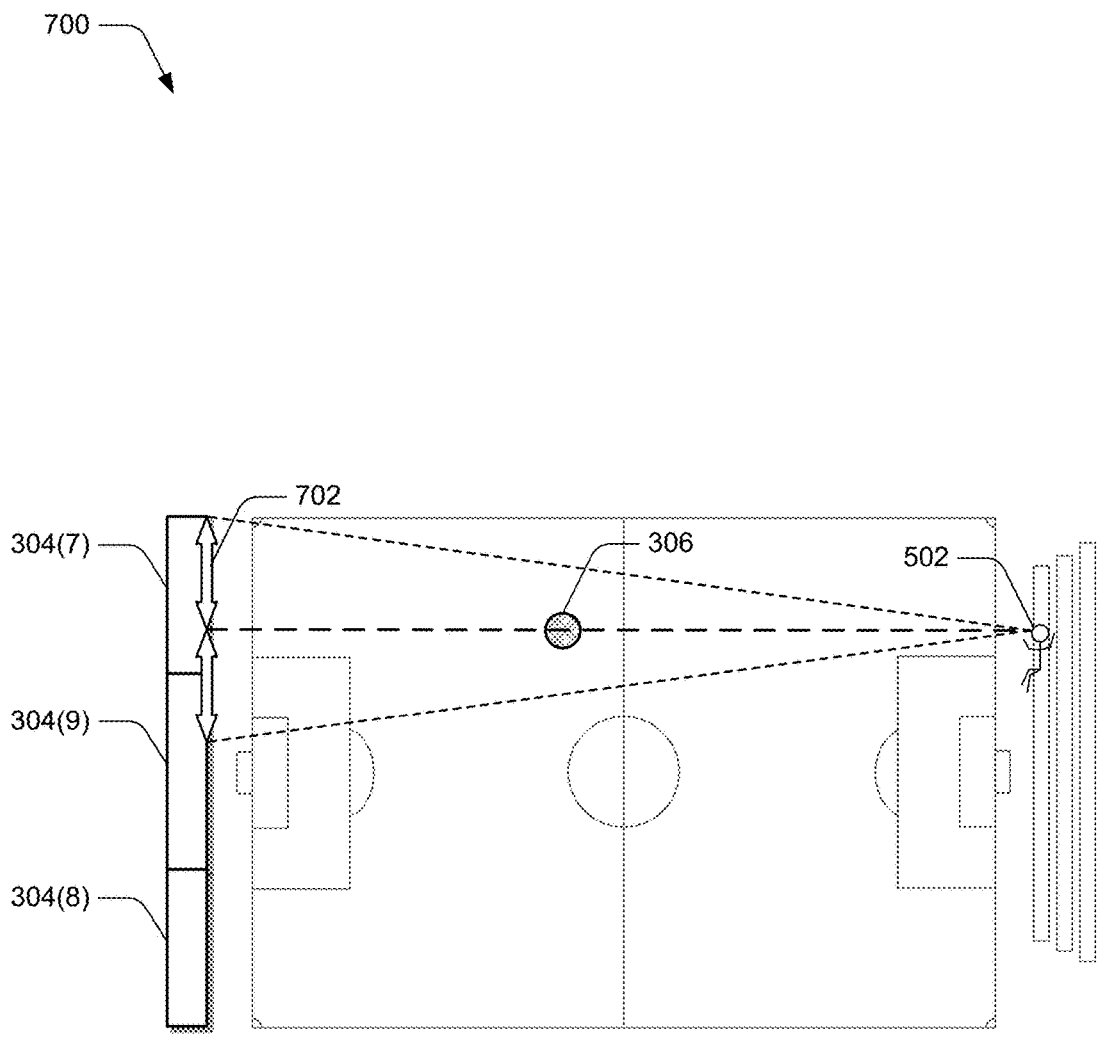
FIG. 7 is an illustration of an example implementation in which a peripheral vision threshold can be employed in accordance with one or more implementations of advertisement placement prioritization.

FIG. 7 is an illustration of an example implementation 700 in which a peripheral vision threshold can be employed in accordance with one or more implementations of advertisement placement prioritization. In implementations, the priority of ad boards within the peripheral vision of the viewer 502 focusing on the focus point 306 can be given additional priority points. However, ad boards 304 that are outside a center of gaze of the viewer 502 can also be visible to that viewer 502. In at least some implementations, the impact of peripheral vision is at maximum if the advertisement displayed is dynamic in nature. Priority points assigned to ad boards 304 which are at a distance d' from the ad board 304 that is along the line of sight of the viewer 502 can be increased, using the following algorithm:

```
D = c          // c is a constant, D is assumed width of field of view of a
               person
while (d' < D)
do,
   P(i + d') = P(i + d') + K * P(i)
   // 0<K<1; K is a function of d' (K ∝ 1/(d')²)
   d' = d' + c
end while
```

The term D represents an assumed maximum width of field of view 702 of a person. In the illustrated example, priority points may be added to ad board 304(9) based on the peripheral vision of the viewer 502, using the above algorithm. Field of view priority points may not be added, however, to other ad boards, such as ad board 304(8), if those ad boards are outside the maximum field of view 702 of the viewer 502.

Additional heuristics can be used to add additional points to the priority score of respective ad boards 304. For example, the priority of an ad board can be directly proportional to the number of people viewing that ad board, using the following equation:

$$P(i) \propto N \qquad \text{equation 6}$$

where the term N represents a number of people viewing the ad board. Accordingly, points may be added to the priority of the ad board based on the ad board having a relatively larger audience in comparison to another ad board having a relatively lower number of viewers. In at least some implementations, one or more face detection algorithms can be utilized to estimate the number of viewers of an ad board.

Using the above equations 1-6, the following equations can be utilized to determine the priority points for a given ad board:

$$Pt(i) = Pt(i)' + \left( \frac{(Q_1 * N)}{(D_1 * (D_2)^{1/2}) * \theta} \right) \qquad \text{equation 8}$$

$$Pt(i) = Pt(i)' + \left( \frac{(Q_2 * N)}{(D_1 * (D_2)^{1/2})} \right) \qquad \text{equation 7}$$

$$Pt(i) = Pt(i)' \qquad \text{equation 9}$$

where the term Pt(i) represents the points associated with an ad board being viewed after taking this viewer into account, the term Pt(i)' represents the points associated with the ad board being viewed before taking this viewer into account, and the terms $Q_1$ and $Q_2$ represent constants. Equation 7 can be implemented when $\pi/18 \leq \theta \leq \pi/3$, equation 8 can be used when $0 \leq \theta < \pi/18$, and equation 9 can be utilized when $\theta > \pi/3$.

In addition, a variety of dimensions can be associated with an ad board and categorized based on various attributes of the audience viewing the ad board. In implementations, a tuple can be associated with each ad board to represent these various dimensions. An example tuple can include (P, M, F, S1, S2, A1, A2, A3, B1, B2, . . . Team1< >, Team2< >, T1, T2, . . . ). In this example tuple, the term P represents priority points associated with the ad board based on equations 1-9. Additional terms in the tuple can represent various characteristics of the audience viewing the ad board, which are usable for targeted advertising. For example, the term M can represent a number of male viewers viewing the ad board, the term F can represent a number of female viewers viewing the ad board, the term S1 can represent a number of supporters of team-1 viewing the ad board, and the term S2 can represent a number of supporters of team-2 viewing the ad board. In addition, the term A1 can represent a number of teenagers viewing the ad board, the term A2 can represent a number of adults viewing the ad board, and the term A3 can represent a number of senior citizens viewing the ad board. Further, the term B1 can represent a number of viewers viewing the ad board and using brand X, while the term B2 can represent a number of viewers viewing the ad board and using brand Y. Thus, any of a variety of different dimensions associated with audience members can be utilized for determining targeted advertisements to display to the audience members via the ad boards.

At least some of the terms in the tuple can represent current performance attributes of participants of the event, such as a player or a team, thus ensuring that advertisements associated with a player or a team, whose performance is poor, are not displayed. For example, the term Team1< > can represent a vector having a score for the current performance of each player in Team-1, the term Team2< > can represent a vector having a score for the current performance of each player in Team-2, the term T1 can represent the current performance of team-1, and the term T2 can represent the current performance of team-2. Thus, any of a variety of different dimensions associated with the current performance of event participants can be utilized in determining advertisements to display via the ad boards 304.

While the techniques described herein are described in relation to a soccer game hosted at a stadium, these techniques can be readily applied to other implementations as well. Thus, any of a variety of venues having multiple ad boards for displaying advertisements or other media content to multiple viewers can be utilized. Some example venues can include malls, arenas, stadiums, circus tents, amphitheaters, domes, speedways, and so on. Some example events can include sports competitions, rodeos, races, concerts, plays, exhibitions, parades, and so on. Thus, the techniques described herein can be implemented during any of a variety of different events hosted at any of a variety of venues.

Example Procedures

The following discussion describes techniques for advertisement placement priority that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 8:
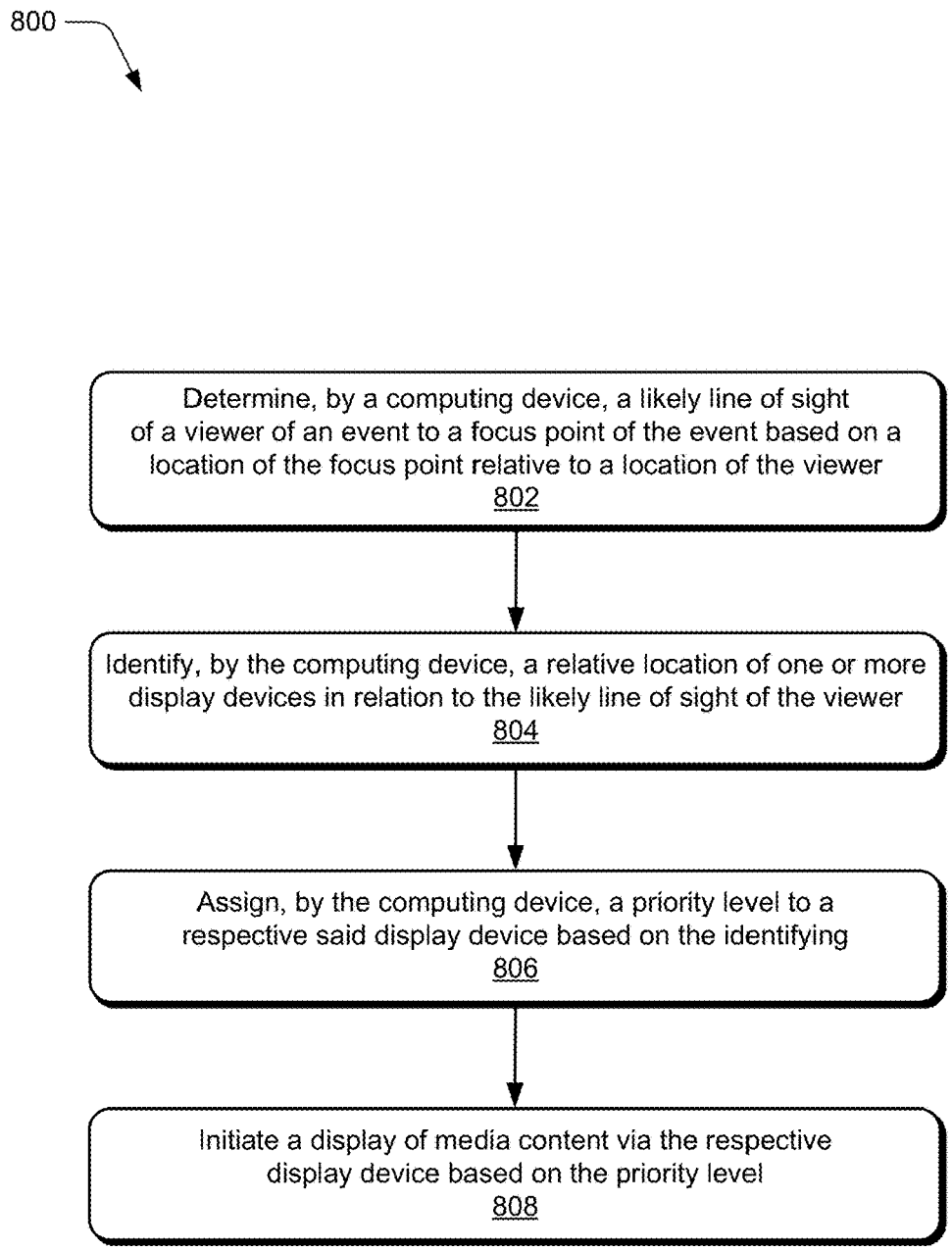
FIG. 8 is a flow diagram depicting a procedure in an example implementation in which techniques for advertisement placement prioritization are employed.

FIG. 8 is a flow diagram depicting a procedure 800 in an example implementation in which advertisement placement prioritization is employed. A likely line of sight of a viewer of an event to a focus point of the event is determined based on a location of the focus point relative to a location of the viewer (block 802). For example, the likely line of sight can be determined based on an axis formed between the location of the viewer and the location of the focus point. These respective locations can be determined using any of a variety of techniques including, for example, relative positioning measured via image recognition techniques, global positioning system (GPS) tracking, and so on. In some implementations, the focus point may move to different locations during the event, such as during gameplay of a soccer game. For example, the soccer ball may be tracked in real time during gameplay using one or more image recognition techniques. During gameplay, however, the view of the ball may be obstructed by one or more objects such as the body of a player. In such situations, a velocity vector can be used to predict a future position of the ball. These and/or other techniques can be employed to track the position of the focus point of the event.

A relative location of one or more display devices is identified in relation to the likely line of sight of the viewer (block 804). For example, various display devices being used at the event can be located at various locations. In implementations, the display devices can be located around a perimeter of a central area used for the event. Based on these locations and/or positioning of the display devices relative to the viewer, the viewer may not be able to view all of the display devices used at the event.

However, the likelihood of the viewer viewing an ad board located along the line of sight of the viewer to the focus point is greater than the likelihood of the viewer viewing another ad board that is not along the line of sight of the viewer to the focus point. Thus, the line of sight of the viewer to the focus point can be used to identify which of the display devices to use to display media content for that viewer. In at least some implementations, this identified display device may be located directly opposite the focus point from the viewer. In this manner, while the viewer is viewing the focus point, the viewer can also see the ad board located behind the focus point from the viewer's perspective, thus allowing media content displayed by that ad board to be viewed by that viewer.

A priority level is assigned to a respective said display device based on the identifying (block 806). For example, because the likelihood of the viewer viewing a first ad board located along the line of sight of the viewer to the focus point is relatively greater than the likelihood of the viewer viewing a second ad board that is not located along the line of sight of the viewer to the focus point, the first ad board can be assigned a relatively higher priority level or otherwise given additional points toward an associated level of priority. Consequently, the priority level can be used to target advertising to the viewer via the first ad board rather than via the second ad board.

A display of media content is initiated via the respective display device based on the priority level (block 808). For instance, if the priority level of a particular ad board is relatively high in comparison to priority levels associated with one or more other ad boards, then media content can be displayed via that particular ad board since the relatively high priority indicates a prime location for displaying content.

In some implementations, as the focus point moves to different locations during the event, the likely line of sight of the viewer to the focus point also moves. Based on these different locations of the focus point, the likely line of the sight of the viewer may thereby intersect with different ad boards. Accordingly, priority scores associated with the different ad boards can be dynamically and automatically adjusted to adapt the prioritization of the ad boards such that targeted advertising for the viewer can follow the viewer's line of sight.

Figure 9:
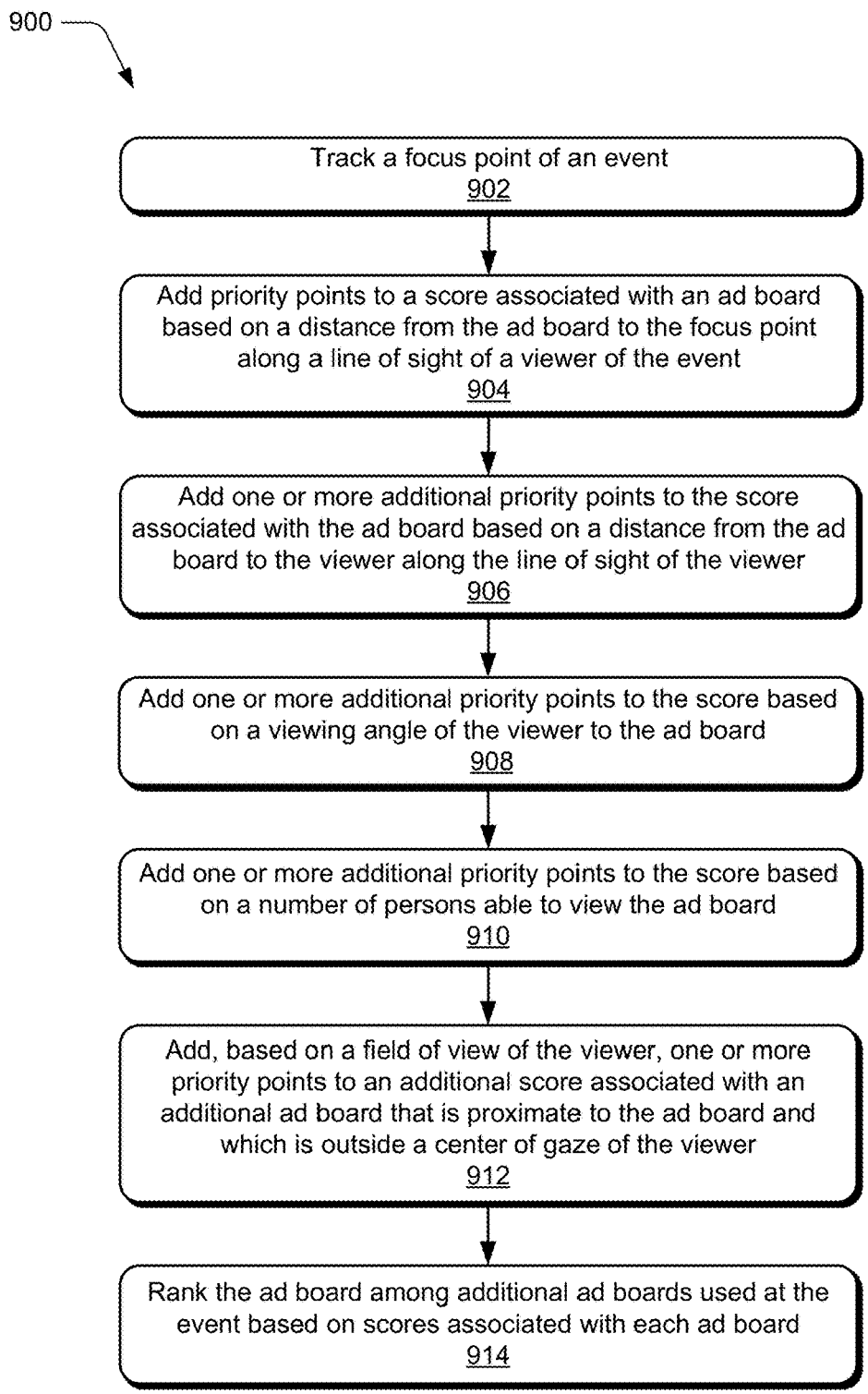
FIG. 9 is a flow diagram depicting a procedure in an example implementation in which techniques for advertisement placement prioritization are employed.

FIG. 9 is a flow diagram depicting a procedure 900 in an example implementation in which advertisement placement prioritization is employed. A focus point of an event is tracked (block 902). This step can be performed in any suitable way. For example, image recognition techniques can be utilized to track a location of the focus point in real time as the focus point moves during the event. Priority points are added to a score associated with an ad board based on a distance from the ad board to the focus point along a line of sight of a viewer of the event (block 904). As described in further detail above, at least some of the priority points that are added to the ad board's score can be inversely proportional to the square root of the distance from the ad board to the focus point along the line of sight of the viewer.

One or more additional priority points are added to the score associated with the ad board based on a distance from the ad board to the viewer along the line of sight of the viewer (block 906). As described above, at least some of the priority points that are added to the ad board's score can be inversely proportional to the distance from the ad board to the viewer along the line of sight of the viewer. One or more additional priority points are added to the score associated with the ad board based on a viewing angle of the viewer to the ad board (block 908. In implementations, the viewing angle is formed between the line of sight of the viewer and an axis that is normal to the ad board being viewed by the viewer. The maximum viewing angle can vary depending on the type of display device used for the ad board. Accordingly, in at least some implementations, at least some of the priority points added to the score are inversely proportional to the viewing angle.

One or more additional priority points are added to the score associated with the ad board based on a number of persons able to view the ad board (block 910). For example, the priority level of an ad board should be greater for relatively larger audiences. Consequently, at least some of the priority points added to the score are proportional to the number of people viewing that ad board. In one or more implementations, the number of people viewing the ad board can be determined using image recognition techniques such as facial recognition to identify a number of faces in the audience facing the ad board.

One or more priority points are added, based on a field of view of the viewer, to an additional score associated with an additional ad board that is proximate to the ad board and which is outside a center of gaze of the viewer (block 912). As mentioned above, at least some priority points are added to scores associated with other ad boards that are proximate or adjacent to the ad board that is along the line of sight of the viewer. This is because these other ad boards are also visible to the viewer that is viewing the focus point, and therefore these other ad boards should have higher priority for displaying content to the viewer.

The ad board is ranked among additional ad boards used at the event based on scores associated with each ad board (block 914). For example, the score associated with the ad board can be used to determine a priority level or rank compared to other ad boards used at the event. By ranking the various ad boards, relatively higher ranked ad boards can be used as prime locations for displaying media content such as advertisements to the viewers. Advertisers may pay a premium to advertise via these prime locations, since the viewers are more likely to see content displayed via these prime locations when the viewers are focusing their attention on the focus point of the event.

Figure 10:
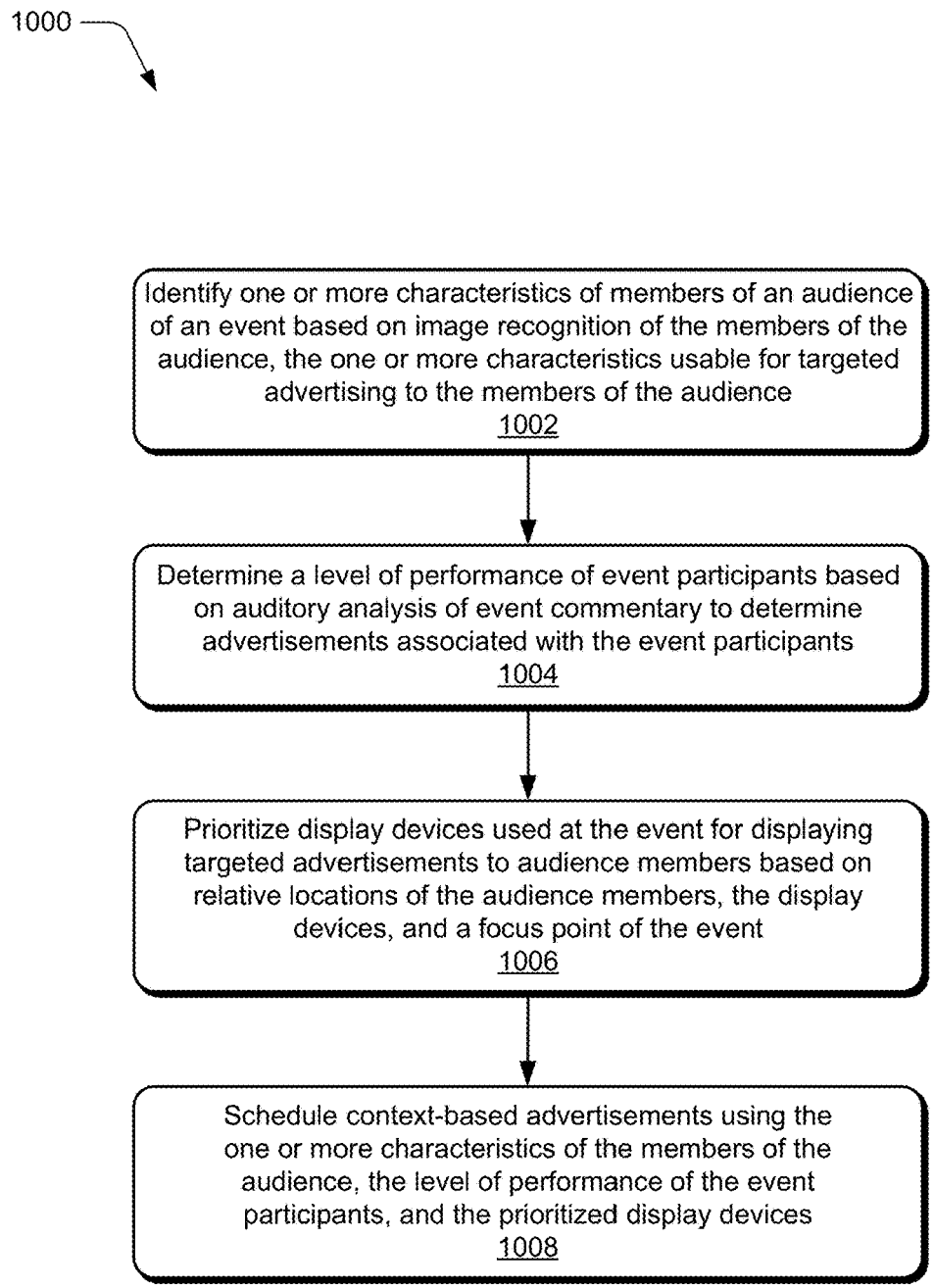
FIG. 10 is a flow diagram depicting a procedure in an example implementation in which techniques for advertisement placement prioritization are employed to schedule context-based advertisements in accordance with one or more embodiments.

FIG. 10 is a flow diagram in an example implementation 1000 in which the techniques described herein can be employed to schedule context-based advertisements in accordance with one or more embodiments. One or more characteristics of members of an audience of an event are identified to determine targeted advertising for the members of the audience (block 1002). This step can be performed in any suitable way. For example, one or more image recognition techniques can be utilized to identify characteristics of audience members such as gender, age, and so on. Additionally, these image recognition techniques can be utilized to identify which team or player that respective audience members are supporting, such as by identifying a team color, logo, or name on respective audience members' clothing, face or body paint, handheld object, and so on. Accordingly, context-based advertisements can be targeted to the audience members based on these identified characteristics.

A level of performance of event participants is determined based on auditory analysis of event commentary to determine advertisements associated with the event participants (block 1004). For example, the commentary provided by announcers during an event such as a soccer game can be analyzed to determine how well certain athletes are performing. In implementations, if a player is performing poorly, then advertisements associated with that poorly performing player may not be presented to the audience. Conversely, if a player is performing well, then advertisements associated with that well-performing player may be presented to the audience.

Display devices used at the event for displaying targeted advertisements to audience members are prioritized based on relative locations of the audience members, the display devices, and a focus point of the event (block 1006). As mentioned above, various heuristics can be employed based on the relative locations of the audience members, the display devices, and the focus point. Priority points associated with each of these heuristics can be added to a score associated with each display device, and each display device can be ranked based on the associated score. Relatively higher ranked display devices can be used as prime locations for displaying context-based advertisements to audience members. In at least some implementations, the heuristics can include a distance from an ad board to the focus point along the line of sight of a viewer, a distance from the ad board to the viewer along the line of sight of the viewer to the focus point, a viewing angle and a field of view of the viewer, and a number of viewers that can view the display device. Further detail and discussion of these features are provided above.

Context-based advertisements are scheduled using the one or more characteristics of the members of the audience, the level of performance of the event participants, and the prioritized display devices (block 1008). By using the information provided via blocks 1002-1006, advertisements can be targeted to specific audience members or sections of audience members based on those audience members' characteristics or interests, and the advertisements can be displayed via specific display devices that those audience members are likely to see while viewing the focus point of the event. Accordingly, the techniques described herein provide prime locations that can be used to improve the effectiveness of advertisements displayed during an event with a large audience.

Example System and Device

Figure 11:
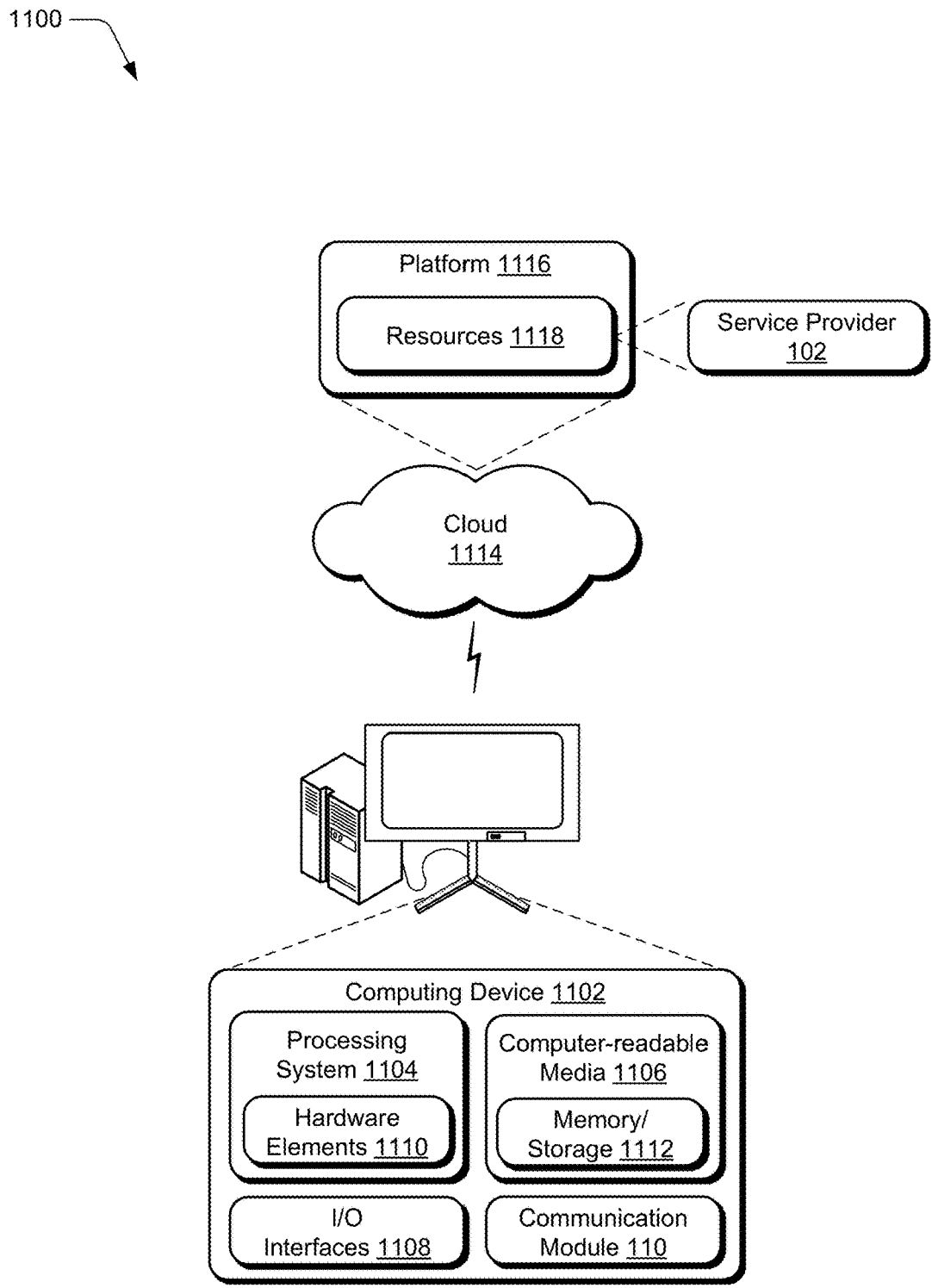
FIG. 11 illustrates various components of an example device that can be implemented as any type of computing device as described herein to implement the techniques described herein.

FIG. 11 illustrates an example system generally at 1100 that includes an example computing device 1102 that is representative of one or more computing systems and/or devices that may implement the various techniques described herein. This is illustrated through inclusion of the service provider 102 and the communication module 110. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

Cloud 1114 includes and/or is representative of a platform 1116 for resources 1118. Platform 1116 abstracts underlying functionality of hardware (e.g., servers) and software resources of the cloud 1114. Resources 1118 may include applications and/or data that can be utilized while computer processing is executed on servers that are remote from the computing device 1102. Resources 1118 can also include services 1120 provided over the Internet and/or through a subscriber network, such as a cellular or Wi-Fi network.

Platform 1116 may abstract resources and functions to connect computing device 1102 with other computing devices. Platform 1116 may also serve to abstract scaling of resources to provide a corresponding level of scale to encountered demand for resources 1118 that are implemented via platform 1116. Accordingly, in an interconnected device embodiment, implementation of functionality described herein may be distributed throughout system 1100. For example, the functionality may be implemented in part on computing device 1102 as well as via platform 1116 that abstracts the functionality of cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
    determining a location of a focus point of an event in real time as the event occurs and a location of a viewer of the event based on data describing the event;
    determining a line of sight of the viewer to the focus point based on the location of the focus point relative to the location of the viewer;
    identifying a relative location of a plurality of display devices, respectively, at the event in relation to the line of sight of the viewer;
    assigning a priority level to the plurality of display devices, respectively, based on a distance along the line of sight of the viewer to the relative location of the plurality of display devices;
    determining which of the plurality of display devices is to be used to display media content based on the assigned priority level of the plurality of display devices, respectively; and
    causing the determined display device to display the media content in real time as changes to the location of the focus point are determined during occurrence of the event.

2. A computer-implemented method as recited in claim 1, further comprising receiving the data describing the event as the event occurs, wherein the data includes at least one of:
    image data of the event captured by one or more cameras;
    video data of the event captured by one or more cameras;
    audio data captured at the event by one or more audio recorders;
    audio data captured of commentary associated with the event; or
    location data determined from the image data or the video data.

3. A computer-implemented method as recited in claim 1, wherein the priority level associated with the plurality of display devices, respectively, is further determined based on a viewing angle of the viewer in relation to the line of sight and an axis that is normal to the plurality of display devices, respectively.

4. A computer-implemented method as recited in claim 1, further comprising:
    measuring a first distance along the line of sight from a respective said display device to the focus point;
    measuring a second distance along the line of sight from the respective said display device to the viewer of the event; and
    determining the priority level associated with the respective said display device based on the priority level being inversely proportional to the first distance or inversely proportional to a square root of the second distance.

5. A computer-implemented method as recited in claim 1, further comprising:
    determining a number of people that can view a respective said display device when focusing on the focus point based on the data describing the event; and
    determining the priority level associated with the respective said display device based on the priority level being proportional to the number of people that can view the respective said display device when focusing on the focus point.

6. A computer-implemented method as recited in claim 1, further comprising:
    obtaining image data depicting the viewer of the event;
    determining a context of the viewer of the event based on one or more characteristics of the viewer, the one or more characteristics identified using at least one image recognition technique; and
    selecting the media content as including one or more advertisements to display via the respective said display device based on the context of the viewer of the event.

7. A computer-implemented method as recited in claim 1, further comprising modifying, based on a field of view associated with the viewer of the event, a priority level associated with the plurality of display devices based on a change to the line of sight.

8. A computer-implemented method as recited in claim 1, further comprising:
    determining one or more characteristics of the viewer of the event using image recognition in relation to at least one digital image depicting the viewer; and
    selecting the media content as context-sensitive media content to display via the respective said display device based on the determined characteristics of the viewer of the event.

9. A computer-implemented method as recited in claim 1, further comprising:
    determining a current performance of a participant of the event based on analysis of the data describing the event; and
    selecting the media content as context-sensitive media content to display via the determined display device based on the current performance of the participant of the event.

10. A computer-implemented method as recited in claim 9, further comprising determining the current performance of the participant of the event by at least analyzing the data corresponding to audible commentary associated with the event.

11. A computing device, comprising:
    one or more processors; and
    a memory having instructions that are executable by the one or more processors to implement a prioritization module that is configured to:
        determine a location of a viewer of an event and a focus point of the event based on event data describing the event, the focus point of the event determined in real time as the event occurs;
        determine an axis formed between the viewer of the event and the focus point of the event based on the determined locations;
        identify a relative location of a plurality of display devices, respectively, in relation to the axis;
        assign a priority level to the plurality of display devices, respectively, based on the identified relative location;
        determine which of the plurality of display devices is to be used to display media content based on the assigned priority level of the plurality of display devices, respectively; and
        cause the determined display device to change the display of the media content in real time as changes to the location of the focus point are determined during occurrence of the event.

12. A computing device as recited in claim 11, wherein the priority level of the plurality of display devices, respectively, is based on a distance from the relative location to the location of the focus point of the event.

13. A computing device as recited in claim 11, wherein the priority level of the plurality of display devices, respectively, is based on a distance from the relative location to the location of the viewer of the event.

14. A computing device as recited in claim 11, wherein the prioritization module is further configured to:
   determine an additional axis that is normal to a respective said display device;
   determine a viewing angle of the viewer of the event that is formed between the axis and the additional axis; and
   determine the priority level of the respective said display device based on the viewing angle of the viewer of the event.

15. A computing device as recited in claim 11, wherein the priority level of the plurality of display devices, respectively, is determined based on a field of view of the viewer of the event in relation to the axis.

16. A computing device as recited in claim 15, wherein the field of view is based on a threshold of peripheral vision of the viewer of the event.

17. A computing device as recited in claim 11, wherein:
   the plurality of display devices are viewable by a respective number of audience members including the viewer of the event; and
   the priority level of the plurality of display devices is based on the respective number of audience members.

18. Computer-readable storage memory comprising stored instructions that are executable by a computing device to implement a prioritization module configured to perform operations comprising:
   receiving data capturing one or more aspects of an event from one or more sensors;
   determining a location of a viewer of the event and changes to a location of a focus point of the event based on the data, the changes to the location of the focus point determined in real time as the event occurs based on the one or more aspects;
   determining a line of sight from the viewer of the event to the focus point of the event based on the location of the focus point relative to the location of the viewer;
   identifying relative locations of a plurality of display devices in relation to the line of sight of the viewer of the event;
   assigning a priority level to the plurality of display devices, respectively, based on the identified relative locations in relation to the line of sight of the viewer of the event;
   determining which of the plurality of display devices is to be used to display media content based on the assigned priority level of the plurality of display devices, respectively; and
   causing the determined display device to update the display of the media content in real time as the changes to the location of the focus point are determined during the occurrence of the event.

19. Computer-readable storage memory as recited in claim 18, wherein the sensors include a camera and the data comprises image data visually capturing the one or more aspects of the event.

20. Computer-readable storage memory as recited in claim 18, wherein:
   the priority level is inversely proportional to a first distance from the plurality of display devices, respectively, to the location of the viewer; or
   the priority level is inversely proportional to a square root of a second distance from the plurality of display devices, respectively, to the location of the focus point.

* * * * *